A. SAVARY.
CHANGE SPEED GEAR.
APPLICATION FILED MAR. 23, 1921.

1,423,458.

Patented July 18, 1922.
3 SHEETS—SHEET 1.

INVENTOR
André Savary
BY
ATTORNEY

INVENTOR
André Savary

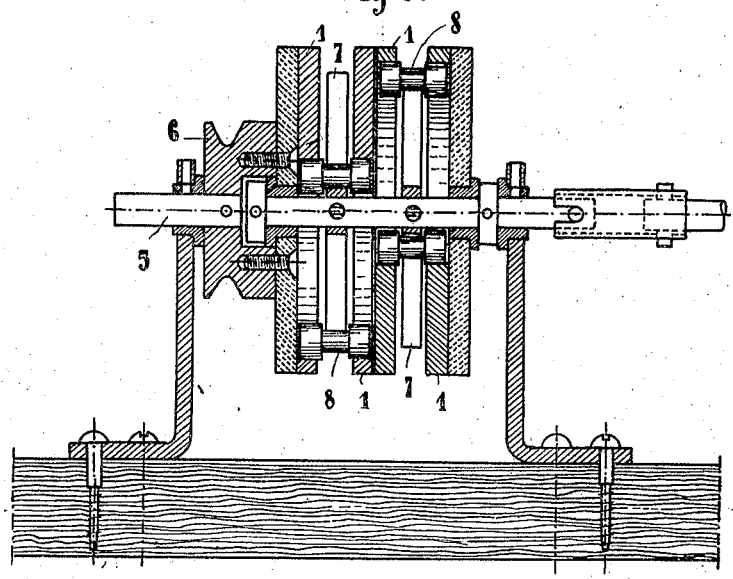
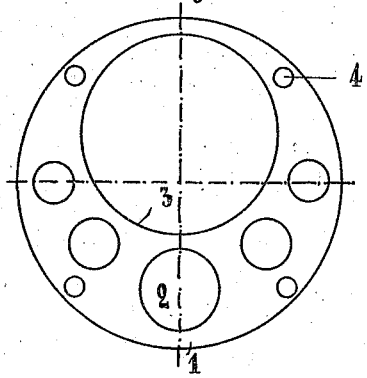
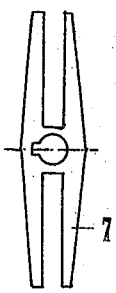

UNITED STATES PATENT OFFICE.

ANDRÉ SAVARY, OF PARIS, FRANCE.

CHANGE-SPEED GEAR.

1,423,458. Specification of Letters Patent. Patented July 18, 1922.

Application filed March 23, 1921. Serial No. 454,833.

(GRANTED UNDER THE PROVISIONS OF THE ACT OF MARCH 3, 1921, 41 STAT. L., 1313.)

*To all whom it may concern:*

Be it known that I, ANDRÉ SAVARY, a citizen of the Republic of France, and resident of Paris (post-office address 9 rue du Cherche-Midi), have invented new and useful Improvements in Change-Speed Gears (for which I have filed an application in France, Patent No. 513,188), which improvements are fully set forth in the following specification.

The present invention has for its object an automatically operated variable speed gear which is applicable to all machine tools, gauges, drills, roller trains, locomotives, automobiles, bicycles, and in general, to all machines which require variable power.

The motor rotating always at its standard speed and developing always its normal power, the change speed gear which forms the subject matter of this invention automatically regulates the speed of the machine or of the driven member, in the inverse ratio to the force which the said machine or the said member has to overcome, and this without the intermediary of trains of gears and operating levers.

The accompanying drawings show, by way of example, a form of this change speed gear.

Figure 1:
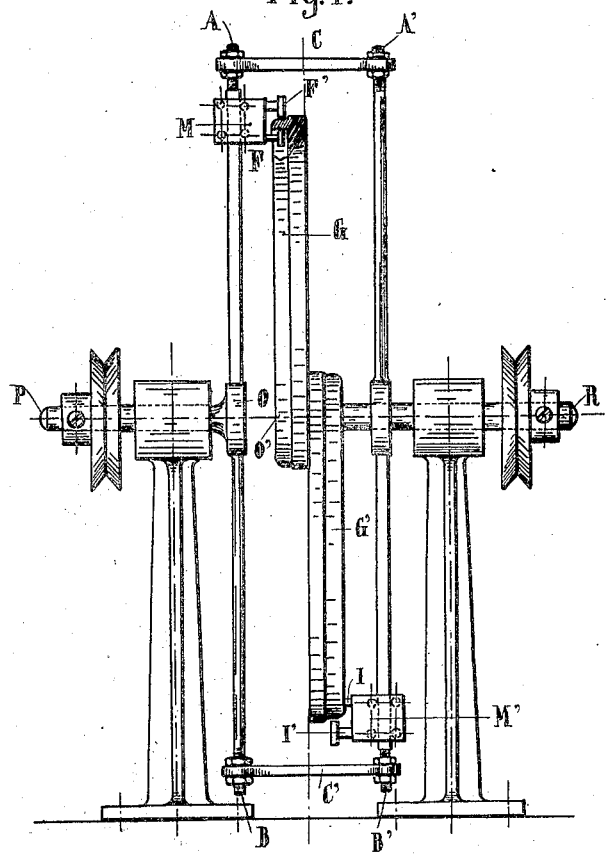
Figure 1 is a view in elevation.

Figures 5, 6 and 7, relate to a modification.

Referring to the drawings, two rods A B and A′ B′, are connected to each other by cross bars C, C′ the bar A B being rigidly connected with the driving shaft O P.

Two races G, G′ of circular form, located opposite each other, are rigidly connected with the driven shaft O′ R, with which they rotate, the centres of these races G and G′ being equally distant from the axis of rotation O′ R.

Two weights M and M′, suitably calculated according to the power of the motor and the resistance to be overcome, are constructed so as to be capable of sliding on the rods A B and A′ B′ respectively while at the same time they move over the races G, G′, either by means of rollers such as F, F′ and I, I′, as shown in the accompanying drawings, or by means of studs and grooves or in any other appropriate manner.

If internal and external rollers be used for the guiding of the weights, the rollers are mounted so as to be capable of moving apart in a suitable manner and so embracing between them the race in its various positions.

When the driving shaft O P is set in motion, the weights M and M′ move apart to the utmost possible extent from the axis of rotation, under the action of centrifugal force. If no resisting force is exerted on the driven shaft O′ R, the said weights place themselves in the position shown in the drawing (see Figures 1 and 2) and the whole arrangement rotates at the same speed.

Figure 2:
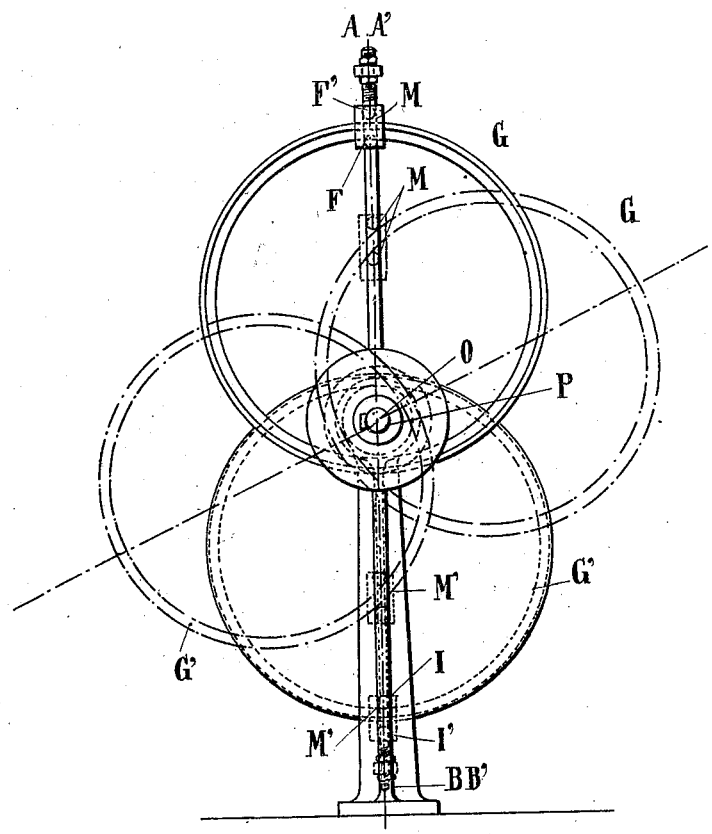
Figure 2 is a side view.

If a resisting force is exerted on the shaft O′ R, the position of the races G, G′ proceeds to vary with respect to that of the rods A B and A′ B′, as is shown in dotted lines in Figure 2, and the weight M and M′ proceed to move along the rods A B and A′ B′ as well as along the races G, G′, carrying these latter along with them and in consequence, the shaft O′ R with which they are connected, in the inverse ratio to the resisting force exerted on the said shaft.

Figure 3:
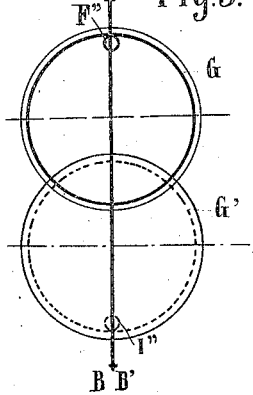
Figures 3 and 4 are explanatory diagrams.
Figure 4:
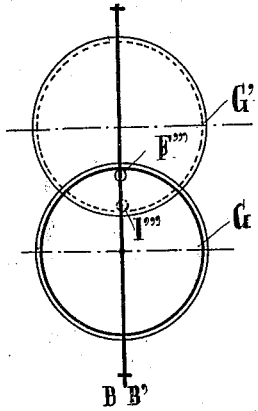

The course of the weights M and M′ on the rods A B and A′ B′ is indicated in the diagrams shown in Figures 3 and 4. In the diagram shown in Figure 4, the weight M acting on the race G and which occupies the extreme position F″ in the diagram shown in Figure 3, has come to occupy the other extreme point of its course at F‴, the race G having remained behind 180° with respect to the position of the rods A B and A′ B′. In like manner the weight M′ acting on the race G′ and which occupied the extreme position I″ in the diagram shown in Figure 3, has come to occupy the other extreme point of its course at I‴, the race G′ having placed itself in a position differing by 180° from the position which it occupies in the diagram shown in Figure 3.

The to and fro movement of the weights M and M′, on the rods A B and A′ B′ will be the more frequent as the resistance augments on the shaft O′ R and the movement will be determined by the sum of the forces transmitted by the weights in these to and fro movements.

The change speed gear device above described may be provided with a greater number of weights and also with a greater number of rods, so as to effect a more continuous transmission.

The position of the races with respect to each other can also be varied. The races may be tangential to each other or they may be superposed more or less completely according to the proximity of their centers with respect to the axis of rotation O', R. They may be of circular or elliptical or oval form or may have any other closed curvilinear form, the said races being arranged symmetrically with respect to the axis of rotation for the purpose of balancing the system. A single eccentric, suitably balanced race may also be employed.

On the other hand springs may be added if necessary to the weights M and M'.

Finally, instead of arranging the races G, G' inside the frame formed by the rods A B and A' B', they may be arranged outside with respect to the said frame.

The modified apparatus, shown in Figs. 5, 6 and 7, has discs 1 with openings 2 in them for the purpose of lightening the system. Each disc 1 has an opening 3 in it which constitutes the race and holes 4 for bolts to pass through which connect the discs to each other. The discs 1 are assembled two by two so that the races are parallel and opposite each other. These discs are kept at the desired distance apart by any convenient means, as by rings, collars etc. and they are connected together by bolts passing through the holes 4. The parts so assembled can rotate freely as a unit on the shaft 5 which is the driving shaft and the assemblage is fixed by any means to a member adapted to transmit movement, for example, in the case of Figure 5, to a pulley 6 over which passes the transmission chain or cable.

The driving shaft 5 carries forks 7 (see Figure 7) which are keyed on to the shaft and in which forks rollers 8 slide freely; and when these rollers are subjected to the action of centrifugal force, they can likewise slide along the races formed by the peripheral edges of the openings 3. The forks 7 replace the rods above shown.

In the example shown in the drawing, the transmission has four races. It must be understood that this number is in no way absolute and that as many groups of discs 1, and consequently, as many races may be provided as may be desired.

The rollers 8 serve as weights by their own weight. Additional weights may be added to them however if it should be considered useful.

The rollers might not be circular which would increase the efficiency thereof.

The races might be circular, as has been indicated above or they may be of any other appropriate form.

Having now particularly described and ascertained the nature of my said invention and in what manner the same is to be performed, I declare that what I claim is:—

1. A change-speed gear, comprising a driving shaft, a member secured to said shaft to rotate therewith, a weight slidably mounted on said member, and an element provided with a race which is slidably engaged at its periphery by the weight; said weight being shiftable along said member away from the axis of said shaft and pressed against said race by the action of centrifugal force, when the driving shaft is rotated, so as to drive said element at a speed which varies automatically consequent upon the to and fro movement of the weight with relation to said axis.

2. A change-speed gear, comprising a driving shaft; a member secured radially thereto to rotate therewith; a weight slidable longitudinally of said member away from the axis of the shaft under the action of centrifugal force when said shaft is rotated; and an element provided with a race which is slidably engaged at its periphery by the weight, and against which said weight is pressed by such force, so as to drive said element at a speed which varies automatically consequent upon the to and fro movement of the weight with relation to said axis.

3. A change-speed gear, comprising alining driving and driven shafts, a rod secured to the driving shaft to rotate therewith, a weight slidably mounted on said rod, and a race secured to the driven shaft and slidably engaged at its periphery by the weight; said weight being shiftable along said rod away from the axis of said shaft and pressed against said race by the action of centrifugal force, when the driving shaft is rotated, so as to drive said element at a speed which varies automatically consequent upon the to and fro movement of the weight with relation to said axis.

4. A change-speed gear, comprising alining driving and driven shafts, a rod secured at its center to the driving shaft to rotate therewith, a rod loosely mounted at its center on the driven shaft and disposed parallel with the first rod, cross-bars connecting together the adjacent ends of the two rods, and a pair of sliding weights mounted in opposite relation, one on one half of one rod and the other on the other half of the other rod; said weights slidably engaging the peripheries of the adjacent races and being shiftable along their respective rods away from the axis of the driving shaft and pressed against said races by the action of centrifugal force when said driving shaft is rotated, so as to rotate the races and the driven shaft at a speed which varies automatically consequent upon the to and fro movement of the weights with relation to said axis.

In testimony whereof I have signed this specification in the presence of two subscribing witnesses.

ANDRÉ SAVARY.

Witnesses:
 FERNAND DUFOUR,
 PIERRE MAMAND.